Patented Mar. 23, 1937

2,074,509

UNITED STATES PATENT OFFICE 2,074,509

PROCESS FOR THE MANUFACTURE OF ARTIFICIAL RESINS

Herbert Hönel, Vienna, Austria, assignor to Beck, Koller & Company, Inc., Detroit, Mich., a corporation of Delaware No Drawing. Application July 5, 1934, Serial No. 733,895. In Austria July 14, 1933

6 Claims. (Cl. 260—8)

This invention relates to a process for the manufacture of artificial resins which are obtained by causing phthalic anhydride, glycerine and castor oil to react by the application of heat.

It has already been proposed to prepare resins by combining these three components; particularly insoluble and infusible masses have been aimed at or also such as are soluble, the solution of which has been blended with cellulose ester lacquers. According to one of these known processes the said three components have been heated together at high temperatures such as 300° C. Another process consists in first combining phthalic anhydride and glycerine so as to form a resinous product; then castor oil is added and the heating continued.

The present process is based on the surprising observation that phthalic anhydride, glycerine and castor oil may be combined to form a resin which on account of its distinct drying property serves as a highly valuable base for varnishes. This product may be obtained when the reaction mixture is heated for a sufficient time at temperatures of about 260 to 270° C. The viscous or resinous reaction product is readily soluble in aromatic hydrocarbons and shows also a good solubility in aliphatic hydrocarbons.

According to my opinion the distinct drying property is due to a transformation of the ricinoleic and isoricinoleic acids which, as is known, are the main constituents of the castor oil, into ricinenic (octadeca-dien) acid and occasionally undecylenic acid. This opinion is based on the fact that water is formed in a considerable quantity and that the iodine number is appreciably increased during the heating at temperatures of about 260-270° C. The reaction product moreover shows a considerable capacity for polymerization which also indicates that the mixed ester produced in this way contains fatty acid radicals having a plurality of double bonds.

The new product may be prepared by combining the three starting components viz. phthalic anhydride, glycerine and castor oil in one step under heating and stirring until combination has taken place; or the phthalic anhydride and the glycerine may also first be heated cautiously forming thereby acidic esters, whereupon the castor oil is added and the heating continued until combination occurs. The temperature of the homogeneous reaction mixture is then gradually raised to about 260-270° C. and maintained for a prolonged period of time at this temperature. When proceeding according to the two-step method the condensation (esterification) of the phthalic anhydride and glycerine should be cautiously performed in order to avoid higher stages of condensation. It is for instance advisable to heat the two first mentioned ester-forming components for some minutes only to about 150–160° C. In this way the acid mono-ester (the acid mono-glyceride) of the phthalic acid or a mixture of the two isomers (α and β) having an acid number of 233 is formed from equimolecular quantities. From equivalent quantities, that is from three mols of phthalic anhydride and two mols of glycerine, there is formed in an analogous manner a mixture of the acid mono-glycerides with the acid (di-basic) di-glycerides, the mixture having an acid number of 267. In the present case generally such proportions of glycerine are employed as lie between the equivalent and equimolecular proportion. All these esters have the character of soft resins. Such phthalic acid glycerine esters react with the castor oil considerably more readily than esters corresponding to stages of higher condensation; thus for example heating to 180–200° C. for ¾ of an hour is required for the homogenization, whilst when working with phthalic glycerine esters of higher condensation stages the double or an even longer period of time is necessary therefor.

The process of the present invention may for example be suitably carried out in the following way:

100 parts of phthalic anhydride, 50 parts of glycerine and 110–120 parts of castor oil are heated together to 180 to 200° C. with continuous stirring until the reaction mass has become homogeneous. About ¾ of an hour is required therefor. Heating is effected in such a manner that a uniform increase of 10–15° C. per hour is obtained. Finally heating is carried out at 265–270° C. for 1½ to 2½ hours. About 5 to 6 parts of water are driven off during this final heating, which approaches the amount of water which theoretically should be formed in this case by the conversion of the ricinoleic acid, the glyceride of which is the main constituent of castor oil, into ricinenic acid.

Immediately after the reaction mixture becomes homogeneous at 180–200° C. the mixture is still soluble in alcohol, while in benzene hydrocarbons it forms only a turbid solution. After reaching the maximum temperature it is found that the solution (1:1) of the resin in xylene and other benzene hydrocarbons shows initially a decrease of viscosity, whereas later on an increase takes place. The first phenomenon is attributable to the fact that splitting off of the hydroxyl group of the ricinoleic acid takes place, whereas the increase of the viscosity is to be explained by the continuing polymerization caused by the increasing unsaturated character of the product. As a further consequence of the particular heat treatment the product loses almost completely its solubility in alcohol becoming at the same time readily soluble in benzene hydrocarbons. A considerable portion of the benzene hydrocarbons may even be replaced by petroleum hydrocarbons such as, for example white spirit, without turbidity or separation taking place. Alcohol can also be added, its effect being to reduce the viscosity to a material degree.

The mass is then allowed to cool down and is drawn off or diluted immediately, for example with xylene. During the cooling an appreciable further increase of viscosity generally takes place which must be taken into account. The resin-like product is somewhat tacky and has a rubber-like character. Particularly remarkable is its drying capacity. It becomes very hard and entirely insoluble in one hour when heated at 120–130° C. in a thin layer. This hardening is considerably accelerated by an addition of the usual catalytic drying agents, such as cobalt-linoleate or -resinate and the like used in the oil varnish industry. A film of the product also hardens at ordinary temperature for which hardening in the presence of a drier about 6 to 10 hours are required.

The acid number of the product is about 20–25. It has a light, honey yellow colour if it has been manufactured under exclusion of air.

If greater quantities of castor oil are employed for the manufacture than those indicated in the aforementioned example (e. g. 200–250 parts), under otherwise like conditions soft or viscous products of lower viscosity are obtained which possess a still better solubility in petroleum hydrocarbons. The drying capacity of the product may be increased in this case by heating for a still longer time, e. g. 4–5 hours to 265 to 270° C.; even slightly higher temperatures may also be employed without danger of gelatinization. The quantity of the water splitted off during the particularly prolonged heat treatment indicates an almost quantitative transformation of the castor oil fatty acids into such of a still higher unsaturated character.

The products obtained in these ways may be directly employed as bases for varnishes of all kinds. White enamels prepared therefrom are of particular importance, since even with stove drying yellowing phenomena scarcely take place. Their application may, however, also be extended, since the products may easily be combined for example with drying oils by heating to about 200° C. or higher. A product which has been obtained from a larger quantity of castor oil (e. g. 200 parts or more instead of the 110–120 parts of the example) is compatible with drying oils in the cold. The preparation of a combined varnish in this case is particularly simplified. A combination with other raw materials of the varnish industry, such as for example with the usual resin esters, natural resins, or phenolic condensation products, can also be performed very easily. Such combinations are also possible during the manufacture of the product. In place of a glycerine resin acid ester the resin acid itself (colophony) and a corresponding amount of glycerine may be employed so that the esterification of the same takes place simultaneously with the manufacture of the product.

Products obtained directly from phthalic acid, glycerine and castor oil as well as those deriving from combination with further materials in the above mentioned way, provided they possess a suitable low viscosity, may also be caused to react according to U. S. Patents 1,800,295 and 1,800,296 and patent applications Ser. Nos. 506,297 and 643,794 now Patents 1,996,069 and 2,058,797 respectively with certain heat hardening phenol-formaldehyde condensation products. These condensation products are obtained with the aid of strong alkalies from formaldehyde in excess over the equimolecular quantity and such phenols which have only two of the reaction favourable positions (o-, o-, p- to the phenolic group or groups) in the molecule unoccupied. A relatively small quantity of these condensation products is advantageously employed. They are either particularly low molecular and of crystalline or oily condition, or they belong to a somewhat higher condensation stage and are of solid resinous condition.

Resins or combination products obtained in the aforesaid way may also be mixed with other varnish raw materials, such as for example cellulose esters, chlorinated rubber, and the like and thus lead to the most varied combination varnishes.

What I claim is:—

1. A process for the manufacture of an artificial resin which comprises slowly heating phthalic anhydride, glycerine and castor oil up to temperatures not substantially below 260° C. nor substantially above 270° C. and maintaining the temperature within this range for a sufficiently prolonged period to obtain a reaction product which is readily soluble in benzene hydrocarbons and which has a distinct drying capacity.

2. A process as set forth in claim 1, wherein the quantity of glycerine employed lies between the equivalent and the equimolecular proportions.

3. A process for manufacturing an artificial resin which comprises first heating phthalic anhydride and glycerine for several minutes at temperatures of about 150–160° C. to form an acidic ester, adding castor oil, then slowly raising the temperature of the total reacting mass to from 260 to 270° C. and maintaining the temperature within this range for a sufficiently prolonged period to obtain a reaction product which is readily soluble in benzene hydrocarbons and which has a distinct drying capacity.

4. A process as set forth in claim 3, wherein the quantity of glycerine employed lies between the equivalent and equimolecular proportions.

5. A process for the manufacture of an artificial resin which consists in combining 100 parts by weight of phthalic anhydride with about 50 parts by weight of glycerine and 110 to 120 parts by weight of castor oil, slowly heating the reaction mixture up to 260 to 270° C., and maintaining the temperature within this range for a period of 1½ to 2½ hours.

6. A process for the manufacture of resinous artificial masses which consists in combining 100 parts by weight of phthalic anhydride with about 50 parts by weight of glycerine and at least 200 parts by weight of castor oil and slowly heating the reaction mixture up to 260–270° C. and maintaining the temperature within this range for 4–5 hours.

HERBERT HÖNEL.